United States Patent [19]

Miura et al.

[11] Patent Number: 5,408,369
[45] Date of Patent: Apr. 18, 1995

[54] POWER SAVING SYSTEM FOR ROTATING DISK DATA STORAGE APPARATUS

[75] Inventors: Tohru Miura, Chofu; Hiroshi Tsuyuguchi, Tokyo, both of Japan

[73] Assignee: Teac Corporation, Tokyo, Japan

[21] Appl. No.: 51,045

[22] Filed: Apr. 21, 1993

[30] Foreign Application Priority Data

Apr. 23, 1992 [JP] Japan .................. 4-130132

[51] Int. Cl.[6] .............................................. G11B 5/54
[52] U.S. Cl. ....................................... 360/75; 360/71; 360/69
[58] Field of Search ......................... 360/69, 71, 75

[56] References Cited

U.S. PATENT DOCUMENTS

| | | | |
|---|---|---|---|
| 4,658,307 | 4/1987 | Tsuyuguchi et al. | 360/69 |
| 4,689,698 | 8/1987 | Ishikawa et al. | 360/69 |
| 4,737,867 | 4/1988 | Ishikawa et al. | 360/69 |

FOREIGN PATENT DOCUMENTS

| | | | |
|---|---|---|---|
| 59-186177 | 10/1984 | Japan | 360/75 |
| 60-163290 | 8/1985 | Japan | 360/69 |
| 63-9088 | 1/1988 | Japan | 360/69 |

*Primary Examiner*—Aristotelis Psitos
*Assistant Examiner*—James L. Habermehl
*Attorney, Agent, or Firm*—Woodcock, Washburn, Kurtz, Mackiewicz & Norris

[57] ABSTRACT

A power saving system for a flexible magnetic disk drive utilizes a power save signal supplied from a host system. When the power save signal indicates that the disk drive is standing by, a power saving circuit holds unpowered desired components of the disk drive such as a disk drive motor circuit, stepper motor circuit, read/write circuit and sensor circuits. The power saving circuit is constructed to permit the transducer to be recalibrated on a reference track on the disk only when the disk drive is turned on, but to inhibit such recalibration when the power save signal indicates the end of standby, thereby avoiding waste of power.

8 Claims, 4 Drawing Sheets

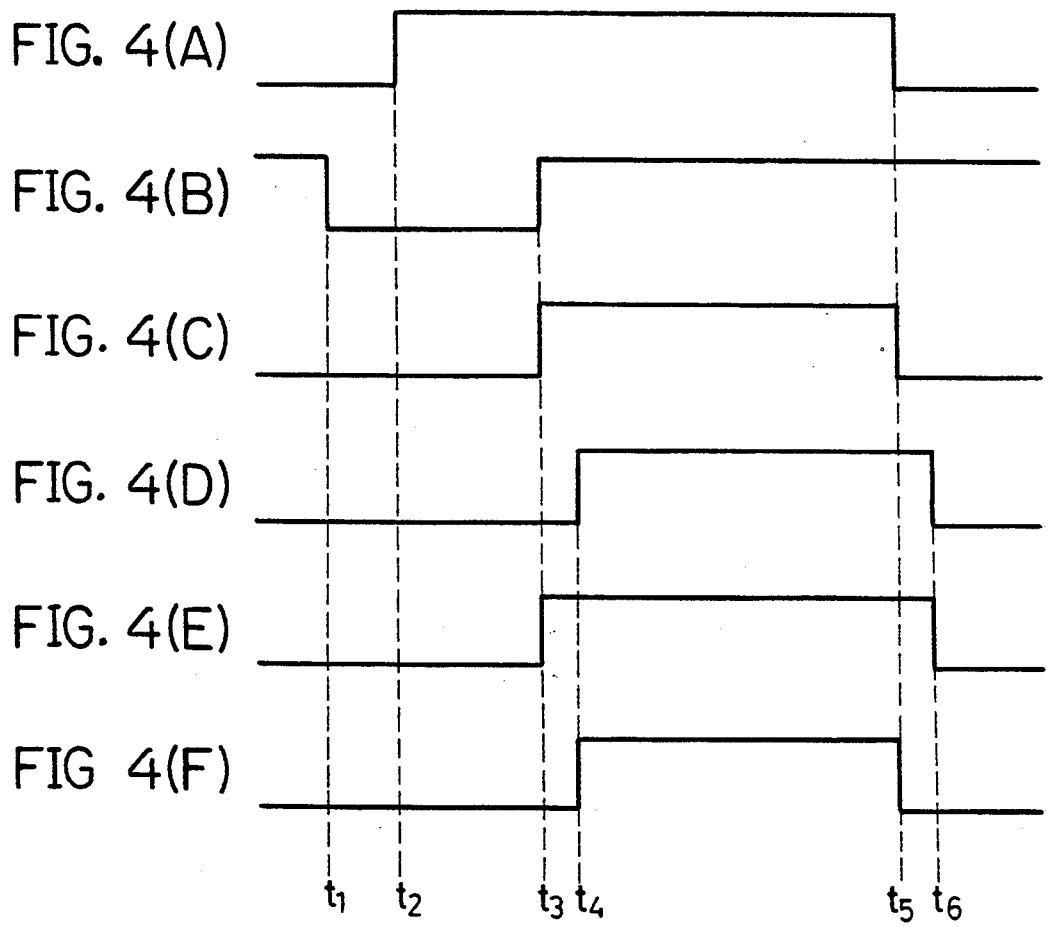

5,408,369

POWER SAVING SYSTEM FOR ROTATING DISK DATA STORAGE APPARATUS

BACKGROUND OF THE INVENTION

This invention relates to apparatus for data transfer with a rotating data storage disk, particularly a flexible magnetic disk, which is normally packaged in cartridge form. More particularly, the invention pertains to a system for saving power unnecessarily consumed by one or more of various standard components of such rotating disk data storage apparatus.

Various power saving schemes have been suggested and used with floppy disk drives. Among such conventional suggestions is that described and claimed in U.S. Pat. No. 4,658,307 filed by Tsuyuguchi et al. and assigned to the assignee of the instant application. Tsuyuguchi et al. teaches to connect the disk motor drive circuit, the head motor drive circuit, and the read/write circuit, all standard components of the disk drive, to a power supply via a power saving switch. This switch is closed only when the floppy disk cartridge is loaded in the disk drive, or when the "drive select" and "motor on" signals from the host system, under which control the disk drive operates, are in prescribed states. The motor drive circuits and read/write circuit are therefore not powered in the absence of the disk cartridge, or when the "drive select" and "motor on" signals are in other than the prescribed states, even if the complete data processing system, comprising the host and one or more disk drives, is powered on. A very substantial saving of power can thus be accomplished.

There are, however, various other power consuming components in the disk drive that were conventionally held powered even when the disk drive was standing by, that is, when no data transfer operation is in progress in the disk drive. Such power consuming components include a supply voltage detector circuit for detecting whether the supply voltage has built up to a predetermined value when the system is switched on, a file protect sensor for sensing whether the loaded disk cartridge is protected against erasure or writing, a disk capacity sensor for discriminating between one-megabyte and two-megabyte disk cartridges which may be loaded interchangeably in the disk dive, and another disk capacity sensor for discriminating between four-megabyte and other capacity disks cartridges.

In exploring the possibilities of further reducing the waste of power by disk drives, the applicant has paid attention to the information which is contained in control data from some host systems and which indicates whether the disk drive is standing by. This information will be hereinafter referred to as the power save signal as it has proved to lend itself for use for power saving purposes. As far as the applicant is aware, however, there has yet been developed no disk drive that utilizes the power save signal for saving power.

The applicant has therefore manufactured an experimental disk drive that becomes powered and unpowered in response to the power save signal. No appreciable saving of power has resulted, however. This is because the power save signal goes high and low at inconveniently short intervals, and the transducer is recalibrated on Track Zero, the reference track, on the disk each time the disk drive becomes powered in response to the power save signal. Transducer recalibration is a very power consuming operation and is unnecessary if the host is held informed of the current transducer position on the disk.

SUMMARY OF THE INVENTION

The present invention seeks, in rotating disk data storage apparatus of the kind defined, to make utmost use of the power save signal, which may be supplied either internally or externally, for reducing the power consumption of the apparatus to a minimum.

Briefly, the invention provides, in an apparatus for data transfer with a rotating data storage disk having a multiplicity of annular, concentric tracks including a reference track, a power saving system comprising positioning means for positioning a transducer on any of the tracks on the disk, a voltage detector circuit connected to power supply means for providing an output signal indicative of whether the supply voltage has built up to a predetermined value, recalibration means connected to the positioning means for causing the same to position the transducer on the reference track on the disk when the supply voltage builds up to the predetermined value, and power save signal means for providing a power save signal having a first state indicative of the fact that the apparatus should be held powered, and a second state indicative of the fact that the apparatus may be held unpowered. Also included is a power saving circuit connected to all of the voltage detector circuit and the recalibration means and the power save signal means for holding any desired component or components of the apparatus unpowered when the power save signal is in the second state. The power saving circuit comprises means for permitting the recalibration means to cause the transducer to be positioned on the reference track when the apparatus is turned on, and for preventing the recalibration means from causing the transducer to be positioned on the reference track when the power save signal changes from the second to the first state;

The power saving circuit is well calculated to hold desired components or components of the apparatus unpowered when the power save signal is in the second state without permitting transducer recalibration to take place each time the power save signal changes from the second to the first state. The transducer is therefore held in the same track position on the disk before and after each power saving period. The track counter, customarily included in the apparatus of this kind, may be held powered throughout in order to keep track of the transducer.

The above and other features and advantages of this invention and the manner of realizing them will become more apparent, and the invention itself will best be understood, from a study of the following description and appended claims, with reference had to the attached drawings showing a preferred embodiment of the invention.

BRIEF DESCRIPTION OF THE DRAWINGS

FIG. 4, consisting of (A) through (F), shows in timed relationship to one another the voltage waveforms appearing in various parts of the FIG. 2 circuitry.

DESCRIPTION OF THE PREFERRED EMBODIMENT

Figure 1:
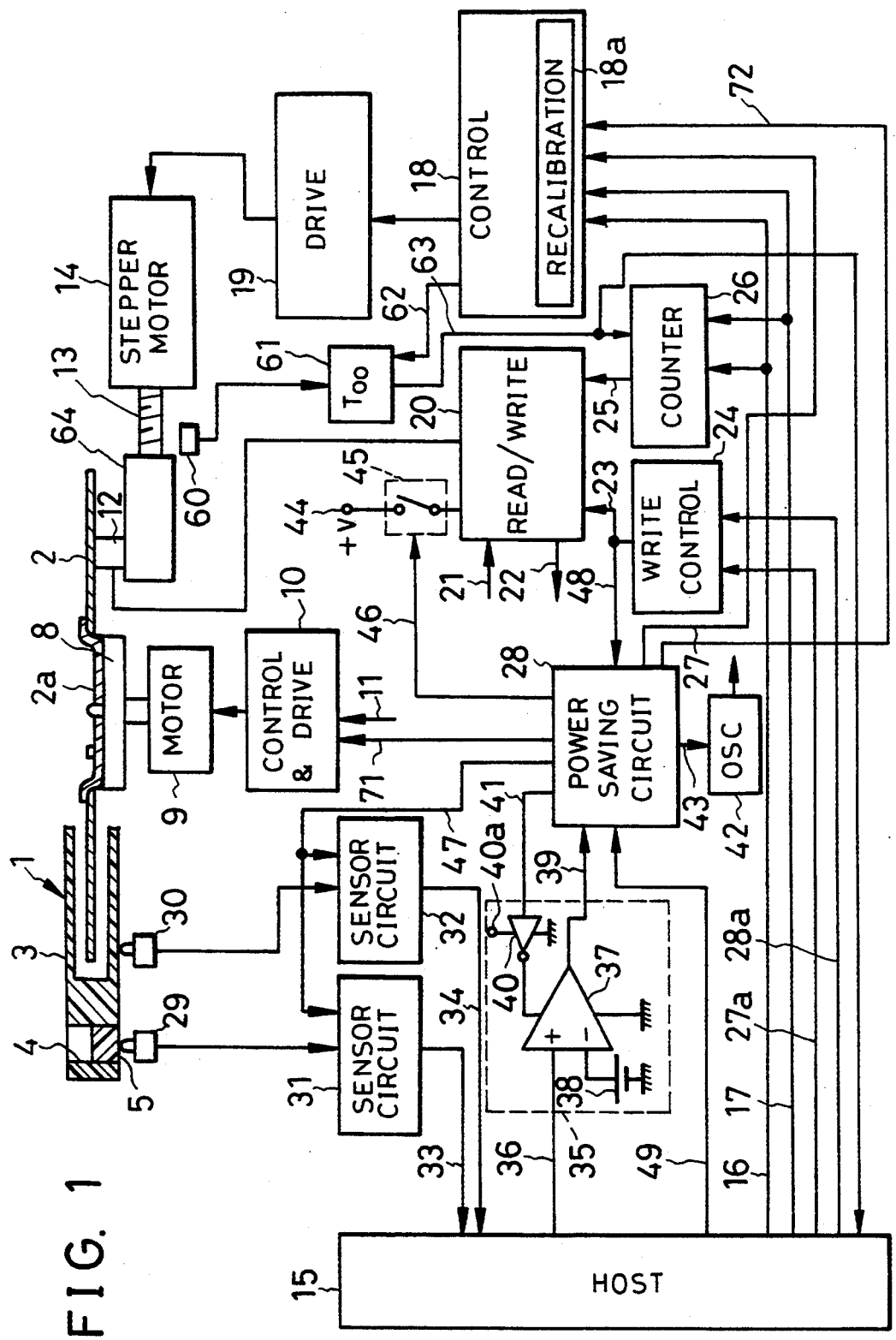
FIG. 1 is a combined pictorial and block diagrammatic illustration of a flexible magnetic disk drive incorporating the principles of the invention, the disk drive being shown together with a host system.
Figure 2:
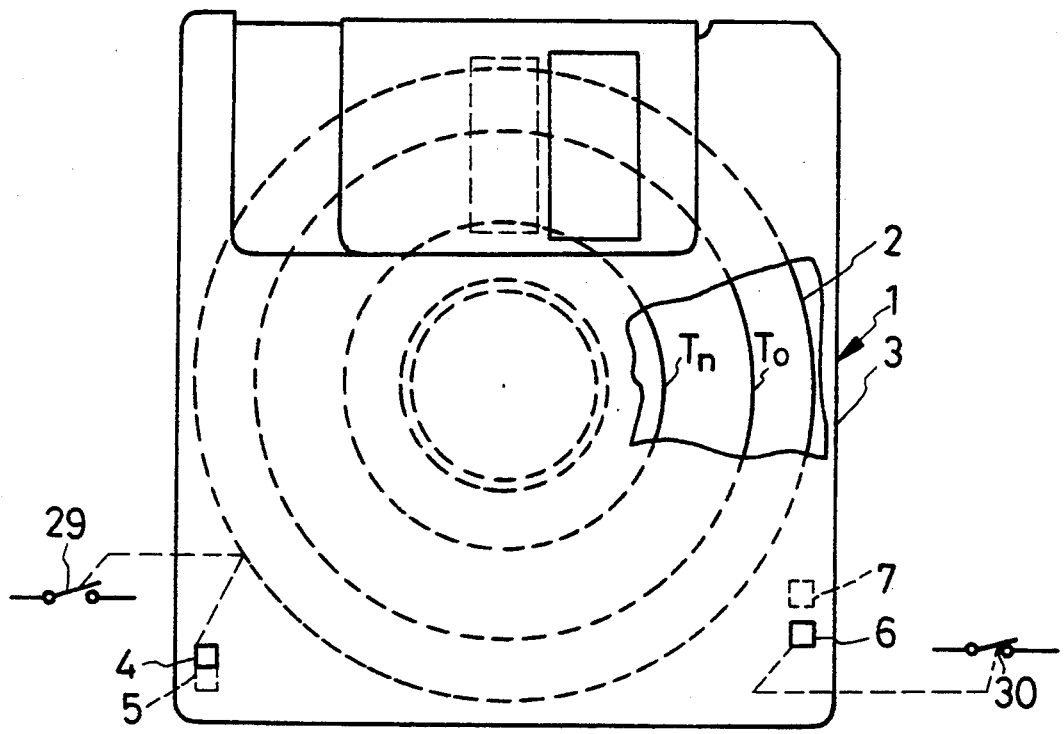
FIG. 2 is a plan view of a magnetic disk cartridge suitable for use with the FIG. 1 disk drive.

The invention will now be described in detail as embodied in a disk drive for use with flexible magnetic disk cartridges having disks of three and a half inch diameter, one of the standard disk sizes, and of various storage capacities commercially available today. FIG. 1 shows the disk drive loaded with such a disk cartridge 1 which is itself better illustrated in FIG. 2. The disk cartridge 1 has a flexible magnetic disk 2 rotatably housed in a protective envelope 3. This envelope has a file protect window 4 which is to be left open or closed by a cover 5 according to whether the disk is to be protected or unprotected against writing.

Although disk cartridges for use with the FIG. 1 disk drive are alike in the foregoing general construction, they come in some different storage capacities. Typical storage capacities are one megabyte, two megabytes, and four megabytes. The two-megabyte disk cartridge has a window 6 in its envelope 3 while the one-megabyte disk cartridge has no such window. The four-megabyte disk cartridge has a window 7 in a position different from that of the window 6.

Whatever the storage capacity, the disk 2 has a multiplicity of annular, concentric tracks $T_o$-$T_n$ on one of its major surfaces. Of these, Track Zero To is the reference track on which the transducer of the disk drive is to be positioned at the time of recalibration.

With reference back to FIG. 1 the disk drive has a turntable 8 on which the metal-made hub 2a of the disk 2 is placed. The turntable 8 is driven directly by an electric disk drive motor 9 which is controllably energized by a motor control and drive circuit 10. A MOTOR ON line 11 is shown connected to this circuit 10 for supplying thereto a MOTOR ON signal from a host system 15.

For data transfer with the disk 2 a transducer 12 is moved across the tracks on the disk by a positioning mechanism herein shown to comprise an electric stepper motor 14. The bidirectional rotation of the stepper motor 14 is translated by a lead screw 13 into the linear travel of a carriage 64 to which the transducer 12 is mounted.

The transducer 12 is to be positioned on any of the tracks on the disk 2 as dictated by stepping pulses and a stepping direction signal supplied from the host 15 to a stepper motor control circuit 18 over lines 16 and 17. Inputting these signals, the control circuit 18 causes a stepper motor drive circuit 19 to drive the stepper motor 14 accordingly. The stepper motor control circuit 18 is conventionally provided with a recalibration circuit 18a for recalibrating the transducer 12 on Track Zero To on the disk 2. For such recalibration the recalibration circuit 18a is equipped to produce internal stepping pulses and an internal stepping direction signal, which are processed just like the external stepping pulses and direction signal from the host 15 for causing the drive circuit 19 to drive the stepper motor 14 in a manner necessary for positioning the transducer 12 on the reference track.

Electrically connected to the transducer 12 is a read/write circuit 20 which in turn is connected to the host 15 by way of a write data line 21 and a read data line 22. The write data line 21 is for inputting data to be written on the disk 2, and the read data line 22 for putting out the data that has been recreated from the output from the transducer 12.

The read/write circuit 20 is additionally connected to a write control circuit 24 by way of a line 23, and to a track counter 26 by way of a line 25. Inputting from the host 15 a DRIVE SELECT signal over a line 27a, and a WRITE GATE signal over a line 28a, the write control circuit 24 generates a WRITE CONTROL signal and an ERASE CONTROL signal for delivery to the read/write circuit 20 over the line 23.

The track counter 26 has inputs connected to the stepping pulse line 16 and stepping direction signal line 17 to providing an output indicative of the disk track on which the transducer 12 is currently positioned. The read/write circuit 20 utilizes this track counter output for switching the constant of a filter, not shown, at the preceding stage of a differentiator, also not shown, of the read circuit between, say, two values according to the radial position of the transducer 12 on the disk 2. The bit density of the recorded data on the disk 2 becomes progressively higher in the radially inward direction of the disk. The switching of the filter constant is necessary for making the differentiator output practically equally favorable in resolution regardless of the radial position of the transducer on the disk. The read/write circuit 20 also utilizes the noted track counter output for making the magnitude of the write current approximately 20 percent less when the transducer is writing on radially inward tracks than when it is writing on radially outward tracks.

The track counter 26 has a reset input R connected to a Track Zero detector circuit 61 by way of a line 63. The Track Zero detector circuit 61 has an input connected to a Track Zero sensor 60, and another connected to the stepper motor control circuit 18 by way of a line 62. Since the Track Zero sensor 60 has inherent sensing errors, the Track Zero detector circuit 61 relies also on the motor control circuit 18, determining that the transducer is on Track Zero when the stepper motor 14 is being so energized as to position the transducer on the reference track. The track counter 25 is therefore reset each time the transducer is infallibly positioned on the reference track.

A file protect sensor 29 is provided for ascertaining whether the file protect window 4 in the cartridge envelope 3 is open or closed, and a disk capacity sensor 30 for sensing the presence or absence of the window 6 in the cartridge envelope. Another disk capacity sensor for sensing the presence or absence of the other disk capacity window 7 is not shown in FIG. 1 because of its lack of pertinence to the invention. Also, in FIG. 1, the positions of the two illustrated sensors 29 and 30 with respect to the disk cartridge 1 do not correspond to the positions of the windows 4 and 6 in the FIG. 2 disk cartridge for illustrative convenience.

The file protect sensor 29 and disk capacity sensor 30 are both shown as switches which are electrically connected to sensor circuits 31 and 32 which have their output lines 33 and 34 connected to the host 15. The single lines drawn between sensor switches 29 and 30 and sensor circuits 31 and 32 are purely indicative of their electrical associations and do not reflect their actual connections. The sensor 29 and 30 and sensor circuits 31 and 32 will be both later described in more detail with reference to FIG. 3.

A supply voltage detector circuit 35 detects whether the supply voltage has built up to a predetermined value, for recalibrating the transducer 12 on the reference track on the disk 2. The circuit 35 comprises a comparator 37 having one input connected to a supply line 36 from the host 15, and another input connected to a reference voltage source 38, and produces an output indicative of whether the supply voltage is higher than the reference voltage. This output is fed into a power saving circuit 28 over a line 39. The comparator 37 is powered and unpowered by a power saving signal supplied from the power saving circuit 28 over of a line 41 having a NOT circuit or inverter 40. Preferably, for minimal power consumption, the inverter 40 should be of complementary metal oxide semiconductor (CMOS) construction having insulating gate field effect transistors. Such a CMOS inverter is powered by its own supply terminal 40a.

An oscillator 42 provides clock pulses needed by the disk drive motor control and drive circuit 10, stepper motor control circuit 18, and write control circuit 24. This oscillator is also powered from the power saving circuit 28 by way of a line 43.

The read/write circuit 20 is powered from a supply terminal 44 via an on/off switch 45. The power saving circuit 28 is connected to the switch 45 by way of a line 46 for its on/off control. The power saving circuit 28 is additionally connected to the sensor circuits 31 and 32 by way of a line 47, to the write control circuit by way of a line 48, to the disk drive motor control and drive circuit 10 by way of a line 71, and to the stepper motor control circuit 18 by way of a line 72.

At 49 is seen a POWER SAVE line provided between host 15 and power saving circuit 28 according to this invention. The POWER SAVE signal on this line 49 indicates whether the disk drive is in the state of standby or operation. The disk drive is standing by when the disk drive motor 9 is out of rotation, when no seek or write operation is under way and, at the same time, when the DRIVE, SELECT signal on the line 27a is off.

Figure 3:
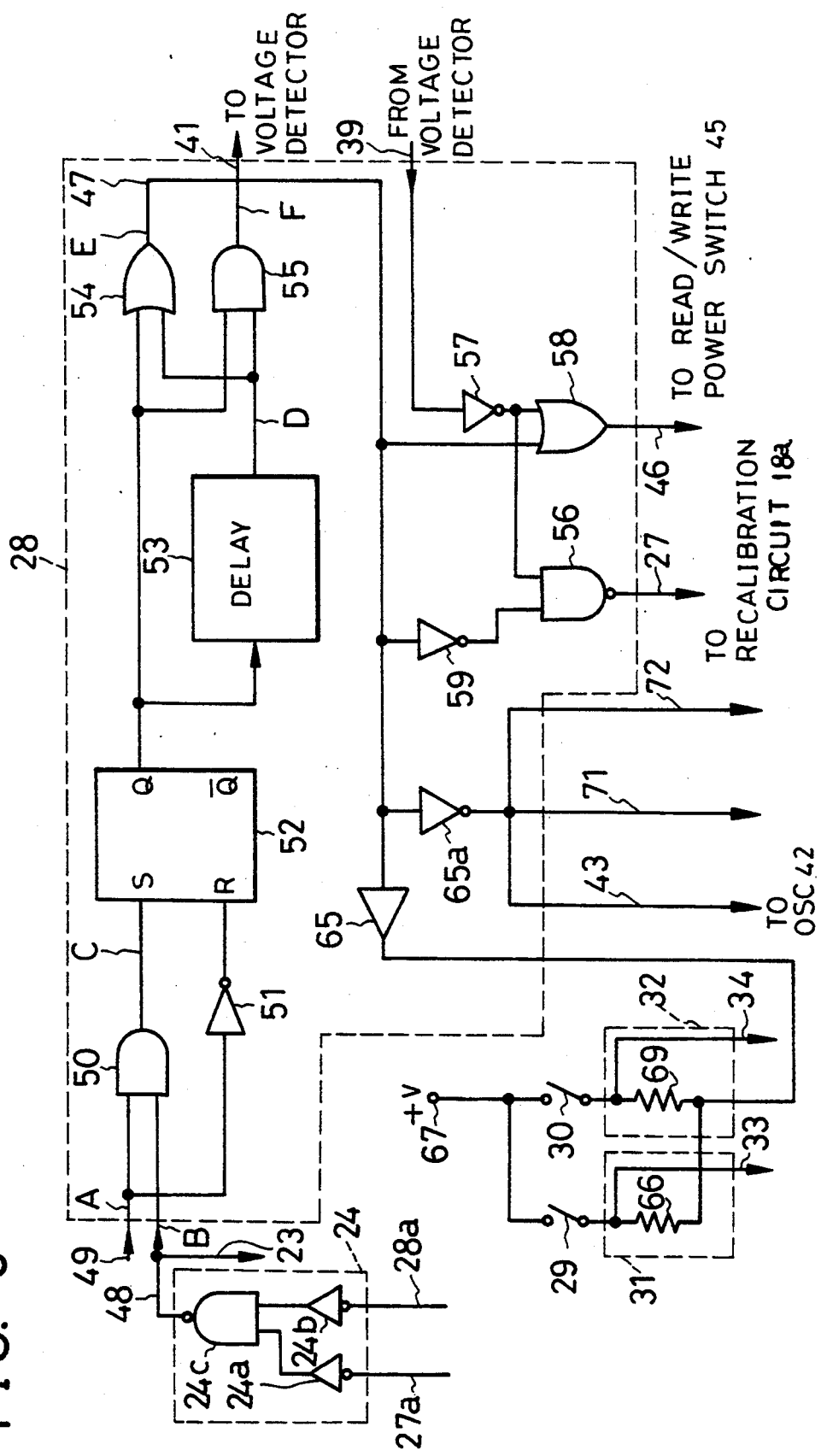
FIG. 3 is a block diagram showing in more detail the power saving circuit, sensor circuits, and write control circuit of the FIG. 1 disk drive.

FIG. 3 is a more detailed illustration of the write control circuit 24, power saving circuit 28 and sensor circuits 31 and 32. The write control circuit 24 comprises two inverters 24a and 24b and a NAND gate 24c. The inverters 24a and 24b have their inputs connected to the WRITE GATE line 27a and DRIVE SELECT line 28a, respectively, and their outputs to the NAND gate 24c. The output of the NAND gate 24c is connected to the read/write circuit 20 by way of the line 23, and to the power saving circuit 28 by way of the line 48. Customarily, however, the write control circuit 24 is equipped with means, not shown, for creating an ERASE CONTROL signal in addition to the illustrated means for forming the WRITE CONTROL signal.

The power saving circuit 28 includes an AND gate 50 having an input connected to the POWER SAVE line 49, and another input to the output line 48 of the write control circuit 24. Alternatively, however, not only the WRITE CONTROL signal line 48 but also an erase control signal line could be connected to the power saving circuit 28, in which the WRITE CONTROL signal and erase control might be directed into the AND gate 50 via another logic gate.

At (A) in FIG. 4 is shown the POWER SAVE signal to be high from time $t_2$ to time $t_5$, indicating that the disk drive is in condition for power saving, and at (B) is shown the WRITE CONTROL signal to be low from time $t_1$ to time $t_3$, commanding the writing of data on the disk 2. The AND gate 50 of the power saving circuit 28 is therefore high from time $t_3$ to time $t_5$, as at (C) in FIG. 4. This high output from the AND gate 50 is meant to prevent the saving of power during writing, even if the POWER SAVE signal is then high for some reason or other.

The AND gate 50 has its output connected to the set input S of an RS flip flop 52 which has an input trigger circuit, not shown, built into it. The reset input R of the flip flop 52 is connected to the POWER SAVE line 49 via an inverter 51. Triggered when the AND gate 50 goes high, as at the time $t_3$ in FIG. 4, the flip flop 52 produces a high output from its output Q. As the POWER SAVE signal goes low at the time $t_5$, as at (A) in FIG. 4, the flip flop 52 is reset at the time by inversion of the POWER SAVE signal supplied from the inverter 51. The output from the flip flop 52 is therefore similar to that from the AND gate 50.

The output of the flip flop 52 is connected, both directly and via a delay circuit 53, to both OR gate 54 and AND gate 55. The delay circuit 53 imparts a relatively brief delay to the flip flop output, producing an output which is high from time $t_4$ to time $t_6$ as at (D) in FIG. 4. The OR gate 54 is therefore high from time $t_3$ to time $t_6$, as at (E) in FIG. 4, whereas the AND gate 55 is high from time $t_4$ to time $t_5$, as at (F) in FIG. 4.

A reference back to FIG. 1 will reveal that the output line 41 of the AND gate 55 is connected to the inverter 40 of the supply voltage detector circuit 35. The inverter 40 is therefore low from time $t_4$ to time $t_5$, holding the circuit 35 unenergized during this time interval in order to save power.

With reference again to FIG. 3 the output line 47 of the OR gate 54 is connected via a buffer amplifier 65, which functions as power saving switch, to the file protect sensor circuit 31 and disk capacity sensor circuit 32. Preferably, the buffer 65 should be of CMOS design. The file protect sensor circuit 31 includes a resistor 66 having one extremity connected to the buffer 65 and another extremity to a supply terminal 67 via the file protect sensor switch 29. The output line 33 of the file protect sensor circuit 31 is connected to the circuit point between sensor switch 29 and resistor 66.

The disk capacity sensor circuit 32 is of like construction, comprising a resistor 69 having one extremity connected to the buffer 65 and another extremity to the supply terminal 67 via the disk capacity sensor switch 30. The output line 34 of the disk capacity sensor circuit 32 is connected to the circuit point between sensor switch 30 and resistor 69.

Thus the resistors 66 and 69 of both sensor circuits 31 and 32 are substantially grounded when the buffer 65 is low. The sensor circuits 31 and 32 are therefore energized from the supply terminal 67, providing on their output lines 33 and 34 the signals indicative of whether the sensor switches 29 and 30 are open or closed. When the buffer 65 is high, on the other hand, both sensor circuits 31 and 32 cannot be energized from the supply terminal 67 regardless of whether the sensor switches 29 and 30 are open or closed.

The output line 47 of the OR gate 54 is also connected to an inverter 65a, preferably a CMOS inverter, which also functions as power saving switch. The inverter 65a is shown connected to the oscillator power line 43, the drive motor control and drive circuit power line 71, and stepper motor control circuit power line 72 in this embodiment. Notwithstanding the showing of FIG. 3 the OR gate output line 47 could be connected to the power lines 43, 71 and 72 via respective inverters instead of via the single inverter 65a.

The output line 47 of the OR gate 54 is further connected to another inverter 59 and thence to a NAND gate 56, which gate has another input connected via still another inverter 57 to the output line 39 of the supply voltage detector circuit 35. The output of the NAND gate 56 is connected to the recalibration circuit 18a within the stepper motor control circuit 18.

The POWER SAVE signal on the host output line 49 cannot possibly be high when the complete data processing system of FIG. 1 is switched on. The OR gate 54 of the power saving circuit 28 will therefore be low before the time $t_3$, as indicated at (E) in FIG. 4, so that the inverter 59 will be high. The supply voltage detector circuit 35 will go high with the rise of the supply voltage to the predetermined value, thereby making the inverter 57 of the power saving circuit 28 go low. Thus, receiving high and low inputs, the NAND gate 56 will go high and so trigger off the recalibration circuit 18a. The stepper motor 14 will then be so energized by its drive circuit 19 as to position the transducer 12 on Track Zero To on the disk 2. The Track Zero sensor circuit 61 will determine that the transducer 12 is on the reference track when the optical Track Zero sensor 60 signals to that effect and when, at the same time, the stepper motor control circuit 18 is producing a signal for causing the drive circuit 19 to energize that phase of the stepper motor 14 which must be energized for positioning the transducer on the reference track. The resulting output from the Track Zero sensor circuit 61 will be directed into the track counter 26 for resetting the same, and into the host 15 for letting the same know that the transducer has been recalibrated.

The power saving circuit of FIG. 3 additionally includes an OR gate 58 having one input connected to the OR gate 54 and another input to the supply voltage detector circuit output line 39 via the inverter 57. The output of the OR gate 58 is connected to the power saving switch 45 for the read/write circuit 20. The power saving switch 45 is therefore off, holding the read/write circuit 20 disconnected from the supply terminal 44, both when the OR gate 54 is high, as from time $t_3$ to time $T_6$ as at (E) in FIG. 4, and when the supply voltage detector circuit 35 is low.

The power saving switch 45 is shown as a mechanical switch for illustrative convenience only; in practice, it may take the form of an electronic switch such as a transistor. An inverter could also be employed in substitution for the switch 45.

A most pronounced operational feature of the disk drive shown in FIG. 1 is that the various components of the disk drive are powered and unpowered not in direct response to the POWER SAVE signal from the host 12 but in response to the output signals of the power saving circuit 28. Inputting the POWER SAVE signal over the line 49, the power saving circuit 28 additionally functions to prevent transducer recalibration from taking place each time the POWER SAVE signal goes low, that is, at each transition from power-saving to non-power-saving period. The NAND gate 56, FIG. 3, of the power saving circuit 28 permits the delivery of a recalibration command to the recalibration circuit 18a only when the FIG. 1 system is switched on, as set forth in more detail hereinbelow with reference to FIG. 4.

Before the $t_2$-$t_5$ power saving period comes to an end, the OR gate 54 of the power saving circuit 28 has been high, as at (E) in FIG. 4, so that the inverter 59 has been low. Also, having been held unpowered during the $t_4$-$t_5$ time interval by the power saving circuit output signal supplied over the line 41 as aforesaid, the supply voltage detector circuit 35 has been low. The inverter 57 of the power saving circuit 28 has therefore been high. Thus, inputting high and low inputs, the NAND gate 56 has been high until the time $t_5$.

Then, as the POWER SAVE signal goes low at the time $t_5$, the AND gate 55 of the power saving circuit 28 will immediately go low, as at (F) in FIG. 4, thereby powering the supply voltage detector circuit 35. As this circuit 35 goes high very shortly thereafter, the inverter 57 of the power saving circuit 28 will go low. However, the other inverter 59 will remain low because the OR gate 54 is high until the time $t_6$, as at (E) in FIG. 4, so that the NAND gate 56 will remain high. Consequently, the recalibration circuit 18a will not be triggered off, it being understood that the recalibration circuit is triggered only when the input signal goes high, as at the startup of the FIG. 1 system.

Assume that the OR gate 54 went low at the time $t_5$, that is, immediately upon expiration of the $t_2$-$t_5$ power saving period, instead of at the time $t_6$. Then the inverter 59 would also high at the time $t_5$. It takes some time for the supply voltage detector circuit 35 to go high upon being powered in response to the low output from the AND gate 55 as above. The momentary low output from the detector circuit 35 after the time $t_5$ would then make the inverter 57 go high. Inputting the high outputs from both inverters 57 and 59, the NAND gate 56 would go low. Then, as the supply voltage detector circuit 35 went high very shortly after the time $t_5$, so would the NAND gate 56 thereby triggering off undesired transducer recalibration.

Actually, of course, no such recalibration takes place because the OR gate 54 goes low at the time $t_6$, instead of immediately upon expiration of the power saving period at the time $t_5$. It will therefore be understood that the $t_5$-$t_6$ time interval must be longer than the time required for the supply voltage detector circuit 35 to go on being powered by the low output from the AND gate 55.

Thus the invention succeeds in making utmost use of the POWER SAVE signal without increasing the power consumption of the disk drive by unnecessary repetition of transducer repositioning on the reference track by the internal recalibration circuit 18. The transducer is therefore left in the same track position on the disk before and after each power saving period. External recalibration under the direction of the host 15 is possible at any time.

Additionally, in the illustrated embodiment, power is further saved with the sensor circuits 31 and 32, supply voltage detector circuit 35, and oscillator 42, which have all heretofore been held energized when the disk drive is standing by.

Although the present invention has been shown and described in the foregoing in very specific aspects thereof, it is not desired that the invention be limited by the exact details of such disclosure. The following, then, is a brief list of possible modifications, alterations and adaptations of the illustrated embodiment which are all believed to fall within as the scope of this invention:

1. The POWER SAVE signal could be produced within the disk drive from control data supplied from the host.

2. The stepper motor control circuit 18 could not be provided with the recalibration circuit 18a; instead, the transducer might be recalibrated by stepping pulses and a stepping direction signal supplied from the host 15, either spontaneously or at the request of the signal fed from the NAND gate 56, FIG. 3, of the power saving circuit 28 over the line 27.

3. In the sensor circuits 31 and 32, FIG. 3, the sensor switches 29 and 30 could be connected between the resistors 66 and 69 and the ground, instead of connecting the resistors between the sensor switches and the ground.

4. The power saving switch 45, FIG. 1, for the read/write circuit 20 could be replaced by an inverter.

5. The inverter 40, FIG. 1, of the supply voltage detector circuit 35, and the buffer 65 and inverter 65a, FIG. 3, of the power saving circuit 28 could all be replaced by electronic switches.

6. The file protect sensor and disk capacity sensor could each be a combination of a light source and a photodetector.

7. The RS flip flop 52, FIG. 3, of the power saving circuit 28 could be replaced by a D flip flop or the like.

8. The invention could be applied to data storage devices other than flexible magnetic disk drives, including optical disk drives.

What is claimed is:

1. In an apparatus for data transfer with a rotating data storage disk having a multiplicity of annular, concentric tracks including a reference track, a power saving system comprising:
   (a) a transducer for reading or writing data on a rotating data storage disk;
   (b) positioning means for positioning the transducer on any of the tracks on the disk;
   (c) power supply means for providing a supply voltage;
   (d) a voltage detector circuit connected to the power supply means for providing an output signal indicative of whether the supply voltage has built the to a predetermined value;
   (e) recalibration means connected to the positioning means for causing the same to position the transducer on the reference track on the disk when the supply voltage builds up to the predetermined value;
   (f) power save signal means for providing a power save signal having a first state indicative of the fact that the apparatus should be held powered, and a second state indicative of the fact that the apparatus may be held unpowered; and
   (g) a power saving circuit connected to all of the voltage detector circuit and the recalibration means and the power save signal means for holding a desired component of the apparatus unpowered when the power save signal is in the second state, the power saving circuit comprising means for permitting the recalibration means to cause the transducer to be positioned on the reference track when the apparatus is turned on, and for preventing the recalibration means from causing the transducer to be positioned on the reference track when the power save signal changes from the second to the first state, including:
       (i) first circuit means for providing a first power saving signal which is similar to the power save signal except for delayed transition from the second to the first state;
       (ii) second circuit means for providing a second power saving signal which is similar to the power save signal except for delayed transition from the first to the second state, the second power saving signal being applied to the voltage detector circuit for holding the same unpowered during the second state thereof; and
       (iii) logic circuit means having a first input connected to the first circuit means for inputting the first power saving signal, a second input connected to the voltage detector circuit for inputting the output signal thereof, and an output connected to the recalibration means;
   (h) whereby any desired component of the apparatus can be held unpowered when the power save signal is in the second state without recalibration taking place each time the power save signal changes from the second to the first state.

2. The invention of claim 1 wherein the amount of delay in transition from the second to the first state of the first power saving signal is greater than a length of time for the supply voltage to build up to the predetermined value.

3. The invention of claim 1 wherein the positioning means is connected to the power saving circuit and powered and unpowered in response to the first power saving signal.

4. The invention of claim 1 further comprising disk drive means for imparting rotation to the data storage disk, the disk drive means being connected to the power saving circuit and being powered and unpowered in response to the first power saving signal.

5. The invention of claim 1 further comprising a read/write circuit connected to the transducer for processing data to be written on and read from the disk, the read/write circuit being connected to the power saving circuit and being powered and unpowered in response to the first power saving signal.

6. The invention of claim 1 further comprising a file protect sensor circuit for sensing whether the disk is protected against writing, the file protect sensor circuit being connected to the power saving circuit and being powered and unpowered in response to the first power saving signal.

7. The invention of claim 1 further comprising a disk capacity sensor circuit for sensing the data storage capacity of the disk, the disk capacity sensor circuit being connected to the power saving circuit and being powered and unpowered in response to the first power saving signal.

8. In an apparatus for data transfer with a rotating data storage disk having a multiplicity of annular, concentric tracks including a reference track, a power saving system comprising:
   (a) a transducer for reading or writing data on a rotating data storage disk;
   (b) positioning means for positioning the transducer on any of the tracks on the disk;
   (c) power supply means for providing a supply voltage;
   (d) a voltage detector circuit connected to the power supply means for providing an output signal indicative of whether the supply voltage has built the to a predetermined value;
   (e) recalibration means connected to the positioning means for causing the same to position the transducer on the reference track on the disk when the supply voltage builds up to the predetermined value;

(f) power save signal means for providing a power save signal having a first state indicative of the fact that the apparatus should be held powered, and a second state indicative of the fact that the apparatus may be held unpowered; and (g) a power saving circuit connected to all of the voltage detector circuit and the recalibration means and the power save signal means for holding a desired component of the apparatus unpowered when the power save signal is in the second state, the power saving circuit comprising means for permitting the recalibration means to cause the transducer to be positioned on the reference track when the apparatus is turned on, and for preventing the recalibration means from causing the transducer to be positioned on the reference track when the power save signal changes from the second to the first state;

(h) a write control circuit for providing a write control signal having a first state for permitting data to be written on the disk by the transducer, and a second state for inhibiting writing; and (i) means included in the power saving circuit and connected to the write control circuit for holding the desired component of the apparatus powered when the write control signal is in the first state even if then the power save signal is in the second state;

(j) whereby any desired component of the apparatus can be held unpowered when the power save signal is in the second state without recalibration taking place each time the power save signal changes from the second to the first state.

* * * * *